Aug. 4, 1925.
M. W. MOESTA
1,548,204
WATER COOLED PORTABLE ELECTRIC WELDING MACHINE
Filed March 24, 1924        2 Sheets-Sheet 2
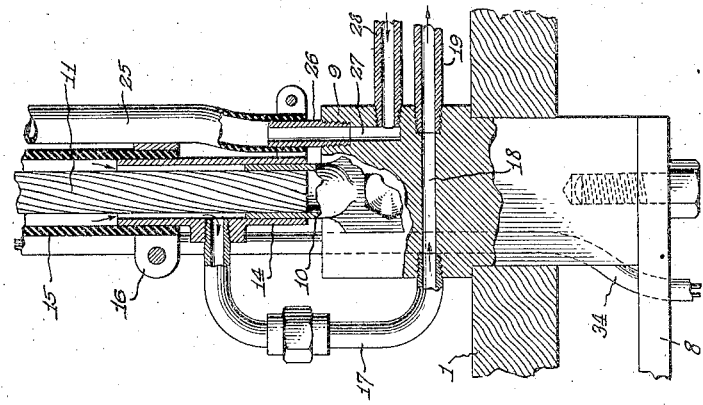
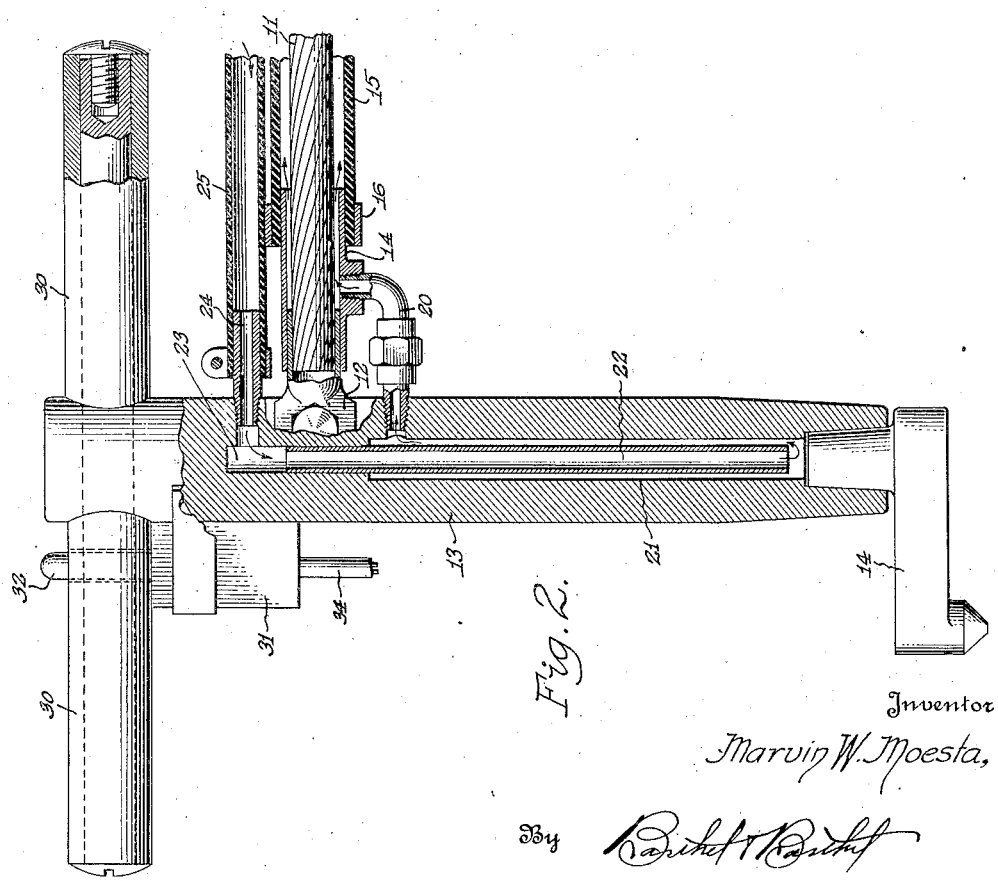
Inventor
Marvin W. Moesta,
By
Attorneys Patented Aug. 4, 1925.

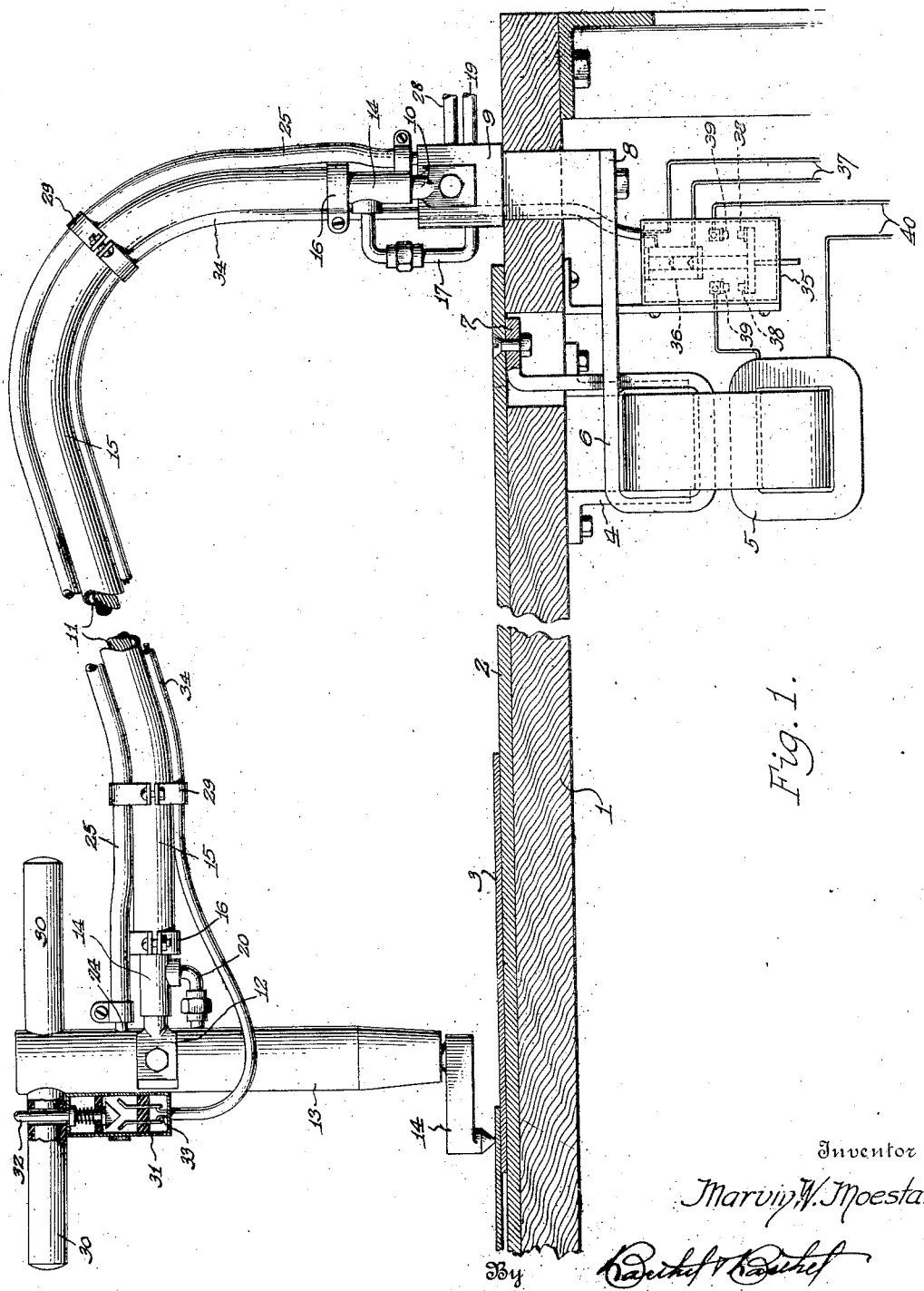

1,548,204

UNITED STATES PATENT OFFICE.

MARVIN W. MOESTA, OF DETROIT, MICHIGAN.

WATER-COOLED PORTABLE ELECTRIC WELDING MACHINE.

Application filed March 24, 1924. Serial No. 701,328.

*To all whom it may concern:*

Be it known that I, MARVIN W. MOESTA, a citizen of the United States, residing at Detroit, in the county of Wayne and State of Michigan, have invented certain new and useful Improvements in Water-Cooled Portable Electric Welding Machines, of which the following is a specification, reference being had therein to the accompanying drawings.

This invention relates to a water-cooled portable electric welding machine and my invention aims to provide a machine wherein both electrodes are movable, such being in contradistinction to machines having one or more stationary electrodes which prevent the machine from being carried to a piece of work and used for welding purposes. Ordinarily the work is carried to a machine, but in many industries, particularly that of automobile manufacture, there are many places requiring welding that cannot be conveniently done, without disassembling parts of the automobile and carrying such parts to an ordinary welding machine. It is in this connection, that my portable welding machine can be used in many places not accessible to an ordinary welding machine.

My invention further aims to provide a welding machine that is water cooled throughout, particularly in connection with the conductor of the movable electrode. Electric welding machines require a high amperage, for instance fifteen thousand on a low voltage ranged from three to six. Ordinarily it is necessary to use a heavy copper wire or cable for this purpose and such a cable cannot be conveniently bent, for instance when manipulating the movable electrode relative to a piece of work. Instead of using a heavy comparatively rigid conductor, my invention aims to use a flexible cable, and to carry off the heat generated by the current, that passes through the cable, the flexible cable is encased in a water jacket through which water or some other cooling agent is circulated. Such a cable and its flexible water cooling jacket will permit of a movable electrode being freely manipulated relative to a piece of work, whether the work be on a bench having a stationary electrode or whether the movable electrode is used in connection with a movable anvil serving as an electrode.

My invention further aims to control a welding current, for instance of two hundred and twenty or four hundred and forty voltage, by a solenoid switch which may be operated by a separate current of one hundred and ten volts, or in some instances the solenoid switch may be operated off of the welding current.

My invention further aims to provide a spot welding machine wherein a movable electrode may be manually manipulated like any ordinary hand tool, and the construction entering into the machine will be hereinafter specifically described and then claimed.

Reference will now be had to the drawings, wherein—

Figure 1 is a side elevation of the welding machine, partly broken away and partly in section;

Fig. 2 is an enlarged longitudinal sectional view of the movable electrode, and

Fig. 3 is a similar view of connections for the movable electrode.

In the drawings, the reference numeral 1 denotes a bench, vise, or suitable support provided with an electrode 2 on which may be placed a piece of work 3. Supported from the bench 1 by a hanger or bracket 4 is a transformer including a secondary winding 5 and a primary winding 6, said primary winding have a terminal connection 7 with the electrode 2 and a terminal connection 8 with a coupling member 9 mounted on the bench 1.

Suitably connected to the coupling member 9 is a socket member 10 for the inner end of a cable 11 and the opposite end of said cable is held by a socket member 12 attached to an electrode support or arm 13 having a detachable electrode 14. As pointed out in the beginning, the cable 11 may be composed of two hundred and twenty-five ampere wires woven into strands and over two hundred strands may form the cable so that it will have a high amperage carrying capacity on a low voltage range from three to six. On account of this cable being made of fine wires it is flexible, thus permitting the electrode arm 13 being freely manipulated, over the piece of work 3 or manipulated in most any position within the length of the cable.

Mounted on the socket members 10 and 12 are T connections 14 and connecting said T connections is a hose or flexible conduit 15 having its ends retained on the connections 14 by clamps 16 or other holding means. The hose 15 is just as flexible as the cable 11 and is retained in spaced relation to the cable 11 by the T connections 14, which are also spaced relative to said cable by the socket members 10.

The inner T connection 14 is coupled by a pipe 17 to the coupling member 9 in which there is a passage 18 communicating with an outlet pipe 19.

The T connection 14 at the outer end of the hose 15 is connected by a pipe 20 to a longitudinal bore 21 within the electrode arm 13. In this bore 21 is a tube 22 having its outer end in proximity to the electrode 14 and its opposite end mounted in a reduced end 23 of the bore 21 so as to communicate with a coupling pipe 24, carried by the arm 13.

Clamped or otherwise mounted on the coupling pipe 24 is another small hose or conduit 25 having its opposite end clamped on a coupling pipe 26 mounted in the coupling member 9 to communicate with a passage 27 in said coupling member, and the passage 27 communicates with a water inlet pipe 28. Water or any other cooling agent admitted at the pipe 28 passes through the passage 27, pipe 26, hose 25, and pipe 24, into the reduced end 23 of the bore 21. The water passes outwardly through the tube 22, back through the bore 21, pipe 20, hose 15, pipe 17, and passage 18 to the outlet pipe 19. This provides a circulation through the hose 15, about the cable 11 and also through the electrode arm 13. Heat will be absorbed and carried off by the water and in consequence of this water jacket the machine is water cooled throughout, without the water jacket interfering in the least with the flexible water and current carrying connection between the arm 13 and the source of supply for the water and electric current.

To at all times retain the small hose 25 in proximity to the large hose 15, so that a workman may conveniently use the machine, a series of straps or other encircling devices 29 may be employed at intervals throughout the length of the hose 15.

The electrode arm 13 is provided with a suitable handle 30 and a plunger switch 31, said plunger switch having a spring retracted plunger or button 32 operatable at the handle 30. The switch has leading-out wires 33 extending through a conduit 34 which may also be retained alongside the hose 15 by the straps 29. The conductor 34 extends to a solenoid switch 35 supported from the bench 1 in proximity to the transformer and the leading-out wires 33 are in circuit through a solenoid 36, with leading-in wires 37 from a suitable source of electrical energy, for instance an ordinary lighting circuit of one hundred and ten volts.

The solenoid 36 has its core supporting contact members 38 adapted to engage contact members 39 included in the circuit of the secondary coil 5 of the transformer, there being leading-in wires 40 for a welding circuit which may be of two hundred and twenty or four hundred and forty volts.

To place the welding machine in operation it is only necessary to press on the plunger or button 32 and close the primary switch which causes the solenoid 36 to be energized to close the main operating circuit for the welding machine. Any means may be employed for maintaining a circulation of water throughout the machine and it is obvious that the electrode arm 13 can be freely manipulated relative to a piece of work on the bench or relative to any other piece of work where another electrode may be located or an electrical connection established in order to complete the circuit for welding purposes. This means that my machine is not necessarily limited to use on a bench, for an anvil or other equivalent may be used with the transformer and solenoid switch at some remote place. Broadly, my invention involves a flexible water and current carrying connection which will permit of an electrode arm or support being freely moved, in contradistinction to an electrode used in a stationary welding machine. I therefore do not care to confine my invention to such details as pipe connections, hose supports or the transformer and switch appurtenances, and such other changes may be made as are permissible by the appended claims.

What I claim is:—

1. In an electric welding machine, the combination of electrodes adapted for a welding circuit, a flexible current carrying connection for one of said electrodes, and a flexible water jacket around said connection.

2. An electric welding machine as called for in claim 1, wherein said connection is in the form of a flexible cable and said jacket in the form of a flexible hose around said cable, and another hose cooperating with the first mentioned hose in providing part of a circulating water cooling system for the machine.

3. An electric welding machine comprising electrodes adapted for a welding circuit, a bored arm engaging one of said electrodes, a flexible electric connection for said arm, and a water jacket for said connection communicating with said arm.

4. An electric welding machine as called for in claim 3, and a hose adjacent said connection cooperating with said water jacket in maintaining a water cooling system for said machine.

5. In an electric welding machine, the combination with a stationary electrode in a welding circuit, of a flexible cable in the same circuit, an electrode connected to said cable, and water cooling means inclosing said cable.

6. In an electric welding machine, the combination with an electrode and a welding circuit, of a cable in said welding circuit, a hollow electrode supporting arm attached to said cable, and conduits communicating with said hollow arm for circulating a cooling agent through said arm, one of said conduits being flexible and inclosing said cable.

7. In an electric welding machine, the combination of a bench, an electrode thereon, a welding circuit, a coupling member in said circuit, a cable attached to said coupling member, a hollow electrode supporting arm attached to said cable, and conduits adapted to circulate water through said hollow arm, one of said conduits providing a water jacket for said cable.

8. An electric welding machine as called for in claim 7, wherein said coupling member has water inlet and outlet connections communicating with said conduits.

9. An electric welding machine as called for in claim 7, in combination with a switch for said welding circuit and a switch on said arm controlling the first mentioned switch.

10. In an electric welding machine, the combination of a bench, an electrode thereon, a welding circuit, a solenoid switch in said circuit, a coupling member in said circuit, a cable attached to said coupling member, a hollow electrode arm attached to said cable, a hose inclosing said cable and communicating with said arm and said coupling member, water connections for said coupling member, a hose outside the first mentioned hose and cooperating therewith and with said arm and coupling member in providing a water circulating system for said cable, and a primary switch on said arm controlling said solenoid switch.

11. The combination of electrodes, a transformer adapted to supply current to said electrodes, a cable engaging one of said electrodes so that it may be freely manipulated relative to said transformer, and means for cooling said cable throughout its length.

12. The combination called for in claim 11, wherein the last mentioned means includes a water carrying hose inclosing said cable.

13. The combination called for in claim 11, wherein the last mentioned means includes conduits adapted to provide for the circulation of water with one of said conduits inclosing said cable to constantly maintain water about said cable.

In testimony whereof I affix my signature in presence of two witnesses.

MARVIN W. MOESTA.

Witnesses:
 ANNA M. DORR,
 O. F. BARTHEL.